Oct. 10, 1961    D. CIARDIELLO    3,004,217
FLASHLIGHT TESTER FOR ELECTRICAL DEVICES
Filed April 27, 1959    2 Sheets-Sheet 1

INVENTOR.
DIANE CIARDIELLO
BY
ATTORNEY

Oct. 10, 1961 D. CIARDIELLO 3,004,217
FLASHLIGHT TESTER FOR ELECTRICAL DEVICES
Filed April 27, 1959 2 Sheets-Sheet 2

INVENTOR.
DIANE CIARDIELLO
BY
ATTORNEY

United States Patent Office 3,004,217
Patented Oct. 10, 1961

3,004,217
FLASHLIGHT TESTER FOR ELECTRICAL DEVICES
Diane Ciardiello, Bronx, N.Y.
(7 Porterfield Court, Huntington Station, N.Y.)
Filed Apr. 27, 1959, Ser. No. 809,254
1 Claim. (Cl. 324—53)

This invention concerns an improved flashlight and circuit tester combined and more particularly relates to certain improvements in flashlight testers of the kind used by electricians for testing continuity in fuses, lamps, cables, switches, relays, sundry circuits, and the like.

A primary object of the invention is to provide a circuit element testing device which may be incorporated in a conventional standard type of flashlight without interfering with its functions as a light source.

Another object of the invention is to provide a flashlight testing device which is capable of testing fuses and other circuit elements of various sizes and lengths by holding the element in contact with certain parts of the device to produce a light indicating continuity.

Another object is to provide a device which may be combined with a flashlight body so that a fuse, lamp bulb or other circuit element may be tested by placing one terminal against a projecting stud of the device and placing another terminal against another projecting stud, whereupon the flashlight will light if the element tested has electrical continuity therethrough.

A still further object is the provision of a continuity testing means for a flashlight including a terminal stud and a terminal bar or strip in series circuit with the lamp bulb and batteries in the flashlight, the terminal bar being provided with one or more projections or projecting studs for contacting a circuit element to be tested.

Another object is the provision of a device of the character described, wherein means are provided for engaging wires and circuit elements to be tested.

For further comprehension of the invention, and of the objects and advantages thereof, reference will be had to the following description and accompanying drawings, and to the appended claim in which the various novel features of the invention are more particularly set forth.

In the accompanying drawings forming a material part of this disclosure:

Figure 1:
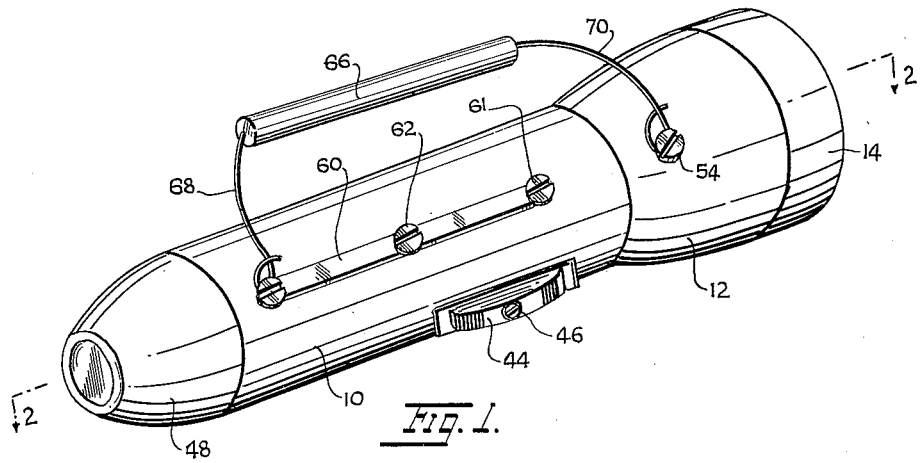
FIG. 1 is a perspective view of a flashlight embodying the invention.
Figure 2:
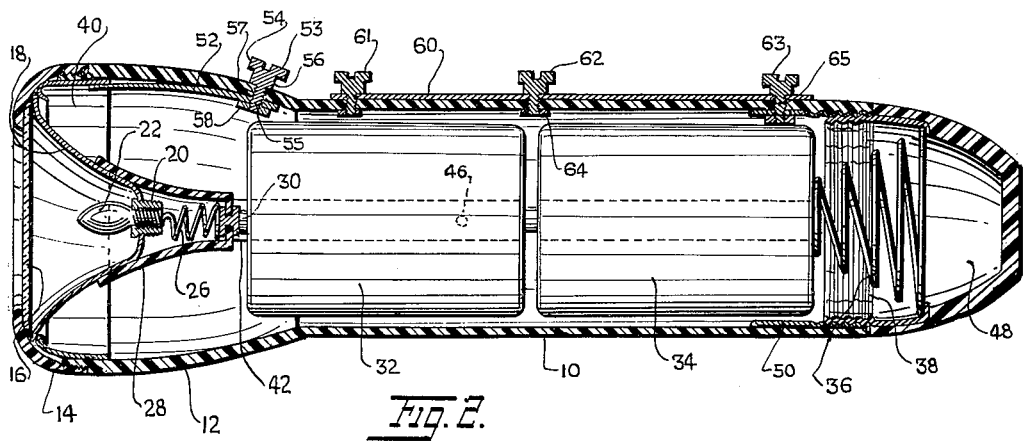
FIG. 2 is a longitudinal sectional view of the flashlight, on an enlarged scale, taken on line 2—2 of FIG. 1.

Referring to FIGS. 1 and 2, there is shown a flashlight including a cylindrical body 10 formed of plastic insulation material. The body extends forwardly to form an enlarged bulbous head 12 to which may be screwed an annular flanged ring 14. A flat lens 16 is engaged between the flange 15 of the ring 14 and the annular rim of an outwardly flaring metal reflector 18. Secured to the reflector is a metal socket 20 in which is removably seated a lamp bulb 22. Electrical contact is maintained between the center terminal of the bulb and a contact 24 via a spring 26 seated in a flaring cup 28 formed of insulation material. The central positive terminal 30 of a dry cell battery 32 makes contact with the contact 24. Another battery 34 is disposed in longitudinal axial alignment with battery 32. The rear end of battery 34 is contacted by a coil spring 36 seated in a metal cup or ring 38. Another metal ring 40 is mounted at the forward end of the body 10 in the head 12. The outer rim of reflector 18 bears on the inwardly turned rim of ring 40.

A metal slider 42 secured to an insulated push button 44 by a screw 46 is disposed in the body 10 and is normally in contact with ring 38. Slider 42 can be advanced by pushing the button forwardly toward the head 12 so that electrical contact is made between the rings 38 and 40 via the slider 42. When button 44 is retracted toward the rear of the body, the slider is out of contact with ring 40. Ring 38 is secured in a plastic insulated cap 48. The forward end of ring 38 extends beyond the cap 48 and is threaded to engage with another threaded ring 50 secured near the rear end of body 10. The cap is attached to the body by threaded engagement of rings 50 and 38.

A metal strip 52 is secured by welding or soldering at one end to ring 40 in the head 12. The strip terminates at the inner end of the head. A stud in the form of a machine screw 54 having a shoulder 56 of reduced diameter with respect to head 53 is inserted through a hole 57 in the head 12 and through a registering hole in strip 52. A nut 58 is threaded on the free end of the shank 55 of screw 54.

Longitudinally spaced from screw 54 on body 10 is an elongated flat metal strip 60. This strip is secured to the body by three spaced studs in the form of machine screws 61, 62 and 63, each having a shank extending through a registering hole in the strip and body 10 and secured by nuts 64. The shank 65 of screw 63 also passes through ring 50 so that direct electrical contact is made between strip 60 and ring 50 through screw 63. The strip 60 and screw 54 are in series circuit with the batteries 32 and 34 and with lamp 22 through the reflector 18 and ring 40.

FIG. 1 shows how a circuit element 66 having terminal lead wires 68, 70 can be tested for electrical continuity with the flashlight. By twisting one lead around the undercut portion of one of the screws 61—63 and the other lead around the undercut portion of screw 54, the lamp 22 will light if electrical continuity in element 66 exists. This arrangement can be used to test resistors, condensers, fuses, cables, lamps, switches, relays, and the like.

Figure 3:
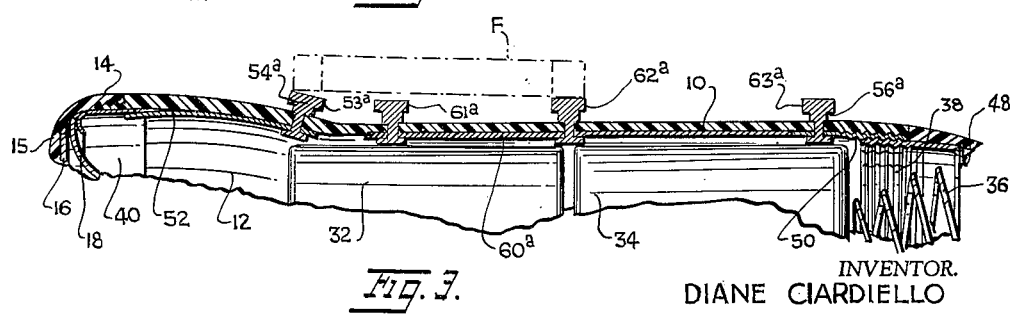
FIG. 3 is a fragmentary sectional view similar to a portion of FIG. 2 showing a modification of the invention.
Figure 4:
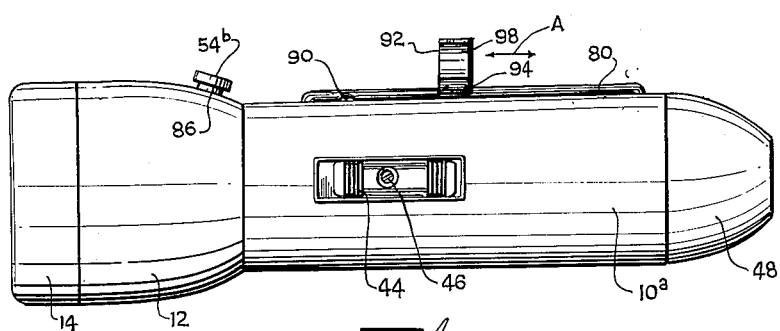
FIG. 4 is a side elevational view of another flashlight showing a further modification of the invention.
Figure 5:
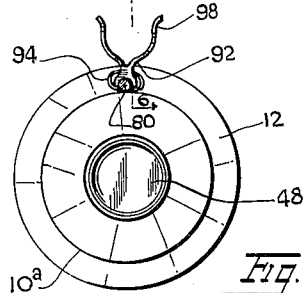
FIG. 5 is an end elevational view of the flashlight of FIG. 4.
Figure 6:
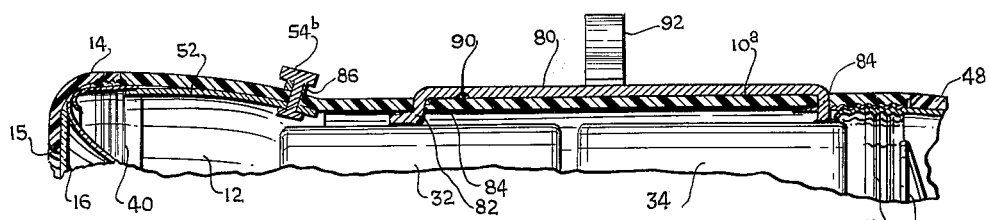
FIG. 6 is a fragmentary sectional view similar to FIG. 3, taken on line 6—6 of FIG. 5.
Figure 7:
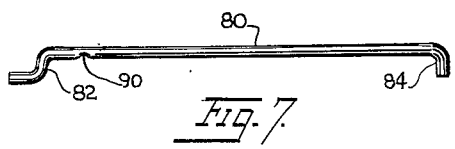
FIG. 7 is a side view of a bar or strip employed with the flashlight of FIGS. 4–6.

In the arrangement of the invention of FIG. 3, a fuse F is shown being tested by being placed in contact with studs in the form of rivets 54ª and 62ª. The arrangement of the flashlight in FIG. 3 is the same as in FIGS. 1 and 2 except that the strip 60ª is located inside the body 10 and the screws 61—63 and 54 have been replaced by rivets 61ª—63ª and 54ª, respectively. The rivets have shoulders 56ª of reduced diameter so that the heads 53ª of the rivets stand off from the body 10.

In the form of the invention shown in FIGS. 4–7, there is provided a conductive wire shunt bar or strip 80 having a doubly bent offset end 82 adapted to pass through a hole 84 in the body 10ª so that end 82 engages thereunder. The other end 84 of the strip is bent inwardly and can be swaged, soldered or riveted to the ring 50 as clearly shown in FIG. 6. Rivet 54ᵇ is provided with a washer 86 so that the head of the rivet stands off from the head 12 of the flashlight. The strip 80 is provided with a notch 90 into which a wire terminal lead can be inserted for testing a circuit or circuit element. The bar 80 has a round cross section adapted to support a clip 92 which has spring fingers 94 adapted to engage on the cylindrical body of the strip or bar 80 as clearly shown in FIGS. 4–6. This clip has larger spring fingers 98 into which a terminal of a fuse can be inserted for supporting the fuse while it is being tested. The clip can be moved adjustably along the strip 80 as indicated by the arrow A in FIG. 4 for testing circuit elements of various sizes and lengths and for holding them stationary while being tested. The round bar 80 is also adapted to retain an alligator clip or other type of clip thereon while a circuit is being tested.

In all the embodiments described, the existence of continuity through the element being tested is indicated by lighting of the lamp. The structure described can be installed in a conventional flashlight, employing the usual end rings therein. The testing structure described does not interfere with use of the flashlight in the normal manner for illumination purposes, although it will be understood, that the flashlight cannot be used as a testing device when button 44 is advanced to light the lamp normally.

The invention provides a testing device which is free of shock hazard. It does not add to the bulk of the flashlight or alter it in any material way. It is inexpensive, rugged, long lasting and foolproof. It provides the electrician, mechanic, repairman, technician and home-owner with a handy appliance for general use both as a conventional flashlight and as a circuit element tester.

While I have illustrated and described the preferred embodiments of my invention, it is to be understood that I do no limit myself to the precise constructions herein disclosed and that various changes and modifications may be made within the scope of the invention as defined in the appended claim.

Having thus described my invention, what I claim as new, and desire to secure by United States Letters Patent is:

In a flashlight having a cylindrical insulated body, a pair of metal rings at opposite ends of the body, a lamp bulb and batteries in series circuit with said rings, a circuit element testing means comprising: a stud mounted at one end of the body in direct electrical circuit with one of the rings, and an elongated electrical conductor carried by the body and spaced longitudinally from the stud, said conductor being in direct electrical circuit with the other of said rings, whereby said lamp bulb lights when one terminal of said element is in contact with said stud and another terminal of said element is in contact with said conductor to indicate electrical continuity exists between the terminals of said element, said stud having a head and an undercut portion for engaging a terminal lead of said element around said undercut portion, said conductor being a wire member having a bent end contacting said other ring, said member having a notch formed therein adjacent the bent end for receiving a terminal lead of said element, said member being juxtaposed to the outside of said body, and a clip having spring fingers engaged on said wire member and movable therealong so that elements of different sizes can be tested between said stud and said clip, the other end of said member being formed with a doubly bent portion engaged in an aperture in said body near said stud but spaced therefrom to prevent displacement of the wire member.

References Cited in the file of this patent

UNITED STATES PATENTS

| | | |
|---|---|---|
| 1,995,476 | Kalb | Mar. 26, 1935 |
| 2,131,351 | Little | Sept. 27, 1938 |
| 2,164,106 | Cooksey | June 27, 1939 |
| 2,275,696 | Stamps | Mar. 10, 1942 |
| 2,276,736 | Olson | Mar. 17, 1942 |
| 2,519,294 | Schneider | Aug. 15, 1950 |
| 2,812,394 | Smith | Nov. 5, 1957 |

FOREIGN PATENTS

| | | |
|---|---|---|
| 995,752 | France | Dec. 7, 1951 |

OTHER REFERENCES

Constant: "Flashlight Becomes A Testing Device," Electrical World, September 29, 1945, p. 108.